US007396870B2

(12) United States Patent
Robert et al.

(10) Patent No.: US 7,396,870 B2
(45) Date of Patent: Jul. 8, 2008

(54) COMPOSITION FOR A TIRE TREAD AND PROCESS FOR ITS PREPARATION

(75) Inventors: Pierre Robert, Perignat-les Sarlieve (FR); Jean-Michel Favrot, Cournon-d'Auvergne (FR); Philippe Laubry, Greer, SC (US); Fanny Barbotin, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 279 days.

(21) Appl. No.: 10/858,204

(22) Filed: Jun. 2, 2004

(65) Prior Publication Data

US 2004/0220315 A1 Nov. 4, 2004

Related U.S. Application Data

(60) Division of application No. 10/303,112, filed on Nov. 22, 2002, now Pat. No. 6,815,487, which is a continuation of application No. PCT/EP01/05802, filed on May 21, 2001.

(30) Foreign Application Priority Data

May 22, 2000 (FR) .................................. 00 06597

(51) Int. Cl.
*C08K 3/18* (2006.01)
*C08K 3/34* (2006.01)

(52) U.S. Cl. .................. 524/430; 524/262; 524/269; 524/492; 524/493

(58) Field of Classification Search ................ 524/430, 524/492, 493, 262, 269
See application file for complete search history.

(56) References Cited

U.S. PATENT DOCUMENTS

| | | | |
|---|---|---|---|
| 3,135,716 A | 6/1964 | Uraneck et al. | |
| 3,244,664 A | 4/1966 | Zelinski et al. | |
| 3,842,111 A | 10/1974 | Meyer-Simon et al. | |
| 3,873,489 A | 3/1975 | Thurn et al. | |
| 3,976,628 A | 8/1976 | Halasa et al. | |
| 3,978,103 A | 8/1976 | Meyer-Simon et al. | |
| 3,978,161 A | 8/1976 | Nielsen et al. | |
| 3,997,581 A | 12/1976 | Pletka et al. | |
| 4,002,594 A | 1/1977 | Fetterman | |
| 4,072,701 A | 2/1978 | Pletka et al. | |
| 4,082,493 A | 4/1978 | Dahlgren | |
| 4,082,817 A | 4/1978 | Imaizumi et al. | |
| 4,129,585 A | 12/1978 | Buder et al. | |
| 4,626,568 A | 12/1986 | Sato et al. | |
| 4,912,145 A | 3/1990 | Wideman | |
| 5,066,721 A | 11/1991 | Hamada et al. | |
| 5,489,628 A * | 2/1996 | Sandstrom | 523/213 |
| 5,494,091 A | 2/1996 | Freeman et al. | |
| 5,580,919 A | 12/1996 | Agostini et al. | |
| 5,583,245 A | 12/1996 | Parker et al. | |
| 5,650,457 A | 7/1997 | Scholl et al. | |
| 5,663,358 A | 9/1997 | Cohen et al. | |
| 5,663,395 A | 9/1997 | Göbel et al. | |
| 5,663,396 A | 9/1997 | Musleve et al. | |
| 5,674,932 A | 10/1997 | Agostini et al. | |
| 5,675,014 A | 10/1997 | Cohen et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,708,053 A | 1/1998 | Jalics et al. | |
| 5,892,085 A | 4/1999 | Munzenberg et al. | |
| 6,211,278 B1 | 4/2001 | Vanel | |
| 6,344,524 B1 | 2/2002 | Roberts et al. | |

FOREIGN PATENT DOCUMENTS

| | | |
|---|---|---|
| DE | 19643035 | 4/1998 |
| EP | 0390012 | 10/1990 |
| EP | 1000971 | 5/2000 |
| FR | 2588874 A1 | 4/1987 |
| JP | 62-281882 A | 12/1987 |
| JP | 2-36203 A | 2/1990 |
| JP | 4-126738 A | 4/1992 |
| WO | 9637547 | 11/1996 |
| WO | 9928376 | 6/1999 |
| WO | 0114470 | 3/2001 |
| WO | WO 200190237 A1 * | 11/2001 |

OTHER PUBLICATIONS

Lovell et al. (Blackley), *Emulsion Polymerization and Emulsion Polymers*, John Wiley & Sons, pp. 558-561 (1997).
Ajjou et al., *Macromolecules*, 29:1784 pp. 1784-1788 (1996).
Tanaka et al., *J. Poly. Sci., Polym. Chem. Ed.*, 17:2975, pp. 2975-2987 (1979).
Sanui et al., *J. Poly. Sci., Polym Chem. Ed.*, 12:1965, pp. 1965-1981 (1974).
Yamamoto et al., Japanese Patent Office abstract of JP62-281882A (Dec. 7, 1987).

(Continued)

*Primary Examiner*—Edward J Cain
(74) *Attorney, Agent, or Firm*—Buchanan Ingersoll & Rooney PC

(57) ABSTRACT

The present invention relates to a cross-linkable or cross-linked rubber composition having improved hysteresis properties in the cross-linked state which is useful for the manufacture of treads for tires. The rubber composition of the present invention comprises at least one diene elastomer having a molar ratio of units originating from conjugated dienes which is greater than 30% and comprising carboxylic acid functions along its chain, and a reinforcing inorganic filler. The present invention further relates to a process for preparing such a cross-linkable or cross-linked rubber composition as well as to a tire having reduced rolling resistance and a tread for a tire where the tread comprises the rubber composition of the present invention.

18 Claims, No Drawings

OTHER PUBLICATIONS

Takashima et al, USPTO translation of JP4-126738A (Sep. 17, 1992).
Chauvel, USPTO translation of FR 2588874 A1 (Apr. 24, 1987).
Scholl et al., USPTO translation of EP 1000971 A1 (May 17, 2000).
Ikemachi Takeshi, USPTO translation of JP2-36203 A (Feb. 6, 1990).
Wendling et al., USPTO translation of DE 19643035 A1 (Apr. 23, 1998).
Brunauer et al., *Journal of the American Chemical Society*, 60:309-319 (Feb. 1938).

* cited by examiner

COMPOSITION FOR A TIRE TREAD AND PROCESS FOR ITS PREPARATION

CROSS-REFERENCE TO RELATED APPLICATIONS

This application is a divisional of application Ser. No. 10/303,112, filed Nov. 22, 2002, now U.S. Pat. No. 6,815,487, which, in turn, is a continuation of International Application Number PCT/EP01/05802, published in French on Nov. 29, 2001 as International Publication Number WO 01/90237 A1 and filed on May 21, 2001, which claims priority to French Patent Application Number 00/06597, filed on May 22, 2000.

FIELD OF THE INVENTION

The present invention relates to a cross-linkable or cross-linked rubber composition having improved hysteresis properties in the cross-linked state, which is usable to constitute a tire tread or-to be used therein. The present invention further relates to a process for the preparation of such a cross-linkable rubber composition, to a tread comprising the cross-linked rubber composition, and to a tire having reduced rolling resistance.

BACKGROUND OF THE INVENTION

Since fuel economies and the need to preserve the environment have become priorities, it has become desirable to produce mixes having good mechanical properties and as low a hysteresis as possible so that they can be processed in the form of rubber compositions useful for the manufacture of various semi-finished products involved in the make-up of tires, including, for example, underlayers, sidewalls or treads. It is also desirable to obtain tires having reduced rolling resistance.

To achieve such objectives, numerous solutions have been proposed, consisting of, in particular, the modification of the structure of diene polymers and copolymers at the end of polymerization by means of functionalizing, coupling or starring agents. The great majority of these solutions have focused on the use of functionalized polymers, which are active with respect to carbon black, with the goal of obtaining a good interaction between the modified polymer and the carbon black.

By way of illustrating the prior art relating to reinforcing fillers formed of carbon black, mention may be made of U.S. Pat. No. 3,135,716, which describes the reaction of living diene polymers at the end of a chain with a polyfunctional organic coupling agent in order to obtain polymers having improved properties. Mention may also be made of U.S. Pat. No. 3,244,664, which discloses the use of tetra-alkoxysilanes as a coupling agent or starring agent for diene polymers.

Silica has been used as a reinforcing filler in cross-linkable rubber compositions, in particular those compositions intended for use in tire treads, for a long time. However, this use has remained very limited because of the unsatisfactory level of certain physical properties of such compositions, in particular, abrasion resistance.

Thus, it has been proposed, in order to overcome these drawbacks, to use functionalized diene polymers, instead of the non-functionalized polymers which were used before, and in particular polymers functionalized by alkoxysilane derivatives, such as tetraethoxysilanes. For example, mention may be made of U.S. Pat. No. 5,066,721, which describes a rubber composition comprising a diene polymer functionalized by an alkoxysilane having at least one non-hydrolyzable alkoxyl radical, which makes it possible to eliminate the polymerization solvent by steam stripping.

One disadvantage of these functionalization reactions lies in the coupling reactions which accompany them, which generally make it necessary to use an excess of alkoxysilane and/or to employ intensive mixing, in order to minimize these coupling reactions.

Another drawback of these reactions lies in the later implementation of the steam stripping operation, which is necessary to eliminate the polymerization solvent. In fact, generally, experience shows that the functionalized polymers obtained undergo changes in macrostructure during this stripping operation, which result in serious degradation of their properties, unless one is limited to using as the functionalizing agent an alkoxysilane belonging to a restricted family, such as that described in the aforementioned U.S. Pat. No. 5,066,721.

Consequently, it may be seen from the above that the use of diene polymers comprising an alkoxysilane function to obtain rubber compositions comprising silica as reinforcing filler is not satisfactory, despite the improved physical properties of these compositions.

Thus, research has been conducted on other functionalization reactions, always with a view to obtaining such rubber compositions.

By way of example, mention may be made of French Pat. No. FR 2.740.778, assigned to the Assignee of the present invention, which discloses the incorporation, into rubber compositions that comprise, as the reinforcing filler, silica in a majority proportion (for example, a blend of silica and carbon black), of diene polymers bearing at the chain end a silanol function or a polysiloxane block having a silanol end. For example, a functionalizing agent consisting of a cyclic polysiloxane, such as hexamethylcyclotrisiloxane, may be used. The functionalized polymers obtained can be separated from the reaction medium, resulting in their formation by steam extraction of the solvent, without their macrostructure and consequently their physical properties changing.

Mention may also be made of European Pat. No. EP 0 877 047, which discloses the incorporation of such polymers having a silanol function in rubber compositions comprising as the reinforcing filler carbon black having silica fixed to its surface.

It has been possible to establish that these polymers impart rubber properties, in particular, hysteresis and reinforcement properties, in the cross-linked state, which are improved compared with those of control compositions based on non-functionalized diene polymers, and which are at least analogous to those of compositions based on diene polymers comprising an alkoxysilane function.

Mention may also be made of European Pat. No. EP 0 692 493, which establishes that diene polymers bearing at the chain end alkoxysilane groups and an epoxy group result in improved reinforcement properties and in reduced hysteresis losses at small and large deformations.

One disadvantage of these polymers, which comprise a functional group that is active for coupling to silica or to carbon black surface-modified by silica, is that the improvement in the hysteresis and reinforcement properties which they impart to the rubber compositions incorporating them is generally accompanied by a processing ability of the non-cross-linked mixes which is compromised when compared to the processing ability of non-functionalized "control" polymers.

Among the other functionalization reactions studied, mention may be made, for example, of the functionalization of the diene polymers along the chain by COOH functions.

The functionalization along the chain can be effected by direct metallation, in the presence of N,N,N',N'-tetramethyl-ethylenediamine (TMED), by means of butyllithium or metallic sodium (as described in U.S. Pat. Nos. 3,978,161 and 3,976,628, respectively), followed by a carbonation reaction by means of carbonic gas. However, such a process has the disadvantage of generally resulting in cuts in the chain of the modified polymer.

Two specific reagents, of the respective formulae $HSCH_2CO_2CH_3$ and $N_2CHCO_2CH_2CH_3$, have also been used to graft COOH functions along the chain of a diene polymer. For the description of the reaction mechanisms relating to the use of these two reagents, reference may be made respectively to the following documents: Sanui et al., *J. Poly. Sci., Polym. Chem. Ed.* 12:1965 (1974) and Tanaka et al., *J. Poly. Sci., Polym. Chem. Ed.* 17:2975 (1979). However, one major disadvantage of using one or the other of these two reagents is that it results in significant changes in macrostructure for the modified polymer.

This functionalization along the chain may also be implemented by means of carbon monoxide, either by hydroformylation followed by oxidation of the aldehyde formed (as described in U.S. Pat. No. 4,912,145), or by direct hydrocarboxylation of the polymer (as described in Ajjou et al., *Macromolecules* 29:1784 (1996)). The catalysts used for these reactions are based on rhodium or palladium. One disadvantage of this functionalization by carbon monoxide lies, on one hand, in the drastic nature of the operating conditions and, on the other hand, in the frequent formation of a gel in the reaction medium.

Functionalization by means of maleic anhydride is more widespread. This type of functionalization makes it possible to obtain succinic anhydride units along the chain, which are precursors of the COOH functions. Reference may be made to U.S. Pat. Nos. 4,082,817 and 4,082,493 for examples of implementation of such functionalization. However, this method of functionalization may also result in the formation of a gel.

The use of diene elastomers comprising COOH functions along the chain for the preparation of rubber compositions useful in tires, is disclosed, in particular, by U.S. Pat. No. 5,494,091. This document discloses a rubber composition filled with carbon black comprising 25 to 55 phr (where phr represents parts by weight per hundred parts of elastomeric matrix) of polyisoprene and 45 to 75 phr of a diene polymer belonging to the group consisting of homopolymers of conjugated dienes and copolymers of conjugated dienes with mono-olefins, such as EPDM terpolymers (of ethylene, propylene and a diene), where part of at least one of these polymers comprises COOH functions grafted along the chain by reaction with a metal salt of unsaturated carboxylic acid, for example zinc dimethacrylate. The composition thus obtained is supposed to have a sufficiently high rigidity to be used in an internal reinforcement rubber for tire sidewalls, so as to permit travel with a flat tire under satisfactory conditions.

SUMMARY OF THE INVENTION

The present invention relates to the unexpected discovery of a cross-linkable or cross-linked rubber composition having reduced hysteresis losses at small and large deformations, which are similar to those hysteresis losses of known compositions based on polymers comprising functional groups which are active for coupling to silica (such as the alkoxysilane or silanol groups mentioned above). The cross-linkable or cross-linked rubber composition of the present invention also has processing properties in the non-cross-linked state which are improved compared with the processing properties of known compositions filled with silica. The processing properties of the rubber composition of the present invention are also comparable to the processing properties of compositions based on non-functionalized polymers that are filled with silica.

The cross-linkable or cross-linked rubber composition of the present invention is obtained by the association of at least one diene elastomer having a molar ratio of units originating from conjugated dienes greater than 30% and comprising carboxylic acid functions along its chain with a reinforcing inorganic filler.

The advantageous characteristics of the rubber composition of the present invention make such a composition useful to constitute a tread for a tire. Thus, the present invention further relates to a tire and a tread for a tire comprising or made of the rubber composition of the present invention. The present invention also relates to a process for forming the rubber composition of the present invention, described in more detail below.

DETAILED DESCRIPTION OF THE INVENTION

In the rubber compositions of the present invention, certain diene elastomers, such as butyl rubbers, nitrile rubbers or copolymers of dienes and alpha-olefins of the EPDM type, for example, cannot be used in the compositions according to the invention because of their reduced content of units of diene origin, which makes the corresponding compositions unsuitable for use in making tire treads.

In certain preferred embodiments, the diene elastomer of the composition according to the present invention is a "highly unsaturated" diene elastomer, meaning a diene elastomer having a content of units of diene origin (conjugated dienes) which is greater than 50%.

The following may be used as the diene elastomer in the compositions according to the present invention: (1) a homopolymer obtained by polymerization of a conjugated diene monomer having 4 to 12 carbon atoms; or (2) a copolymer obtained by copolymerization of one or more dienes conjugated together or with one or more vinyl-aromatic compounds having 8 to 20 carbon atoms.

The diene elastomer used in the compositions according to the present invention may be prepared anionically or by any other method, provided that it has the aforementioned characteristics. Mention may be made, for example, of synthesis by radical polymerization effected in emulsion, which is known to give polymers having COOH functions along the chain and which is described, in particular, in Lovell et al., *Emulsion Polymerization and Emulsion Polymers*, John Wiley & Sons, pp. 558-561 (1997) and in the references cited therein.

Suitable conjugated dienes include, in particular: 1,3-butadiene; 2-methyl-1,3-butadiene; 2,3-di(C1 to C5 alkyl)-1,3-butadienes, such as 2,3-dimethyl-1,3-butadiene or 2,3-diethyl-1,3-butadiene; 2-methyl-3-ethyl-1,3-butadiene; 2-methyl-3-isopropyl-1,3-butadiene; an aryl-1,3-butadiene; 1,3-pentadiene; and 2,4-hexadiene.

Suitable vinyl-aromatic compounds include, for example: styrene; ortho-, meta- and para-methylstyrene; the commercial mixture "vinyltoluene"; para-tert. butylstyrene; methoxystyrenes; chlorostyrenes; vinylmesitylene; divinylbenzene; and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, statistical, sequential or microsequential elastomers, and may be prepared in dispersion or in solution. They may be coupled and/or starred or alternatively functionalized with a coupling and/or starring or functionalizing agent.

Polybutadienes are preferred, in particular those having a content of 1,2-units of between 4% and 80%, or those having a content of cis-1,4 bonds of more than 80%; synthetic polyisoprenes; butadiene-styrene copolymers, in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%; butadiene-isoprene copolymers, in particular those having an isoprene content of between 5% and 90% by weight and a glass transition temperature ($T_g$) of between −40° C. and −80° C.; isoprene-styrene copolymers, in particular those having a styrene content of between 5% and 50% by weight and a $T_g$ of between −25° C. and −50° C.

In the case of butadiene-styrene-isoprene copolymers, those which are suitable are, in particular, those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene-styrene-isoprene copolymer having a $T_g$ of between −20° C. and −70° C.

In particularly preferred embodiments, the diene elastomer of the composition according to the present invention is selected from the group of highly unsaturated diene elastomers consisting of polybutadienes (BR), synthetic polyisoprenes (IR), butadiene-styrene copolymers (SBR), butadiene-isoprene copolymers (BIR), isoprene-styrene copolymers (SIR), butadiene-styrene-isoprene copolymers (SBIR), and mixtures of two or more of these compounds.

Even more preferably, the diene elastomer is selected from the group consisting of polybutadienes, butadiene-styrene copolymers and butadiene-styrene-isoprene copolymers.

According to a preferred embodiment of the invention, the diene elastomer used is a butadiene-styrene copolymer prepared in solution having a styrene content of between 20% and 30% by weight, a content of vinyl bonds of the butadiene fraction of between 15% and 65%, a content of trans-1,4 bonds of between 15% and 75% and a $T_g$ of between −20° C. and −55° C.

According to another preferred embodiment of the present invention, the diene elastomer used is a butadiene-styrene copolymer prepared in emulsion, preferably having a total quantity of emulsifier which is less than 3.5 phr (phr: parts by weight per hundred parts of elastomer).

In the present invention, the aforementioned diene elastomers useful in the present compositions may be obtained from any anionic initiator (whether it be monofunctional or polyfunctional) or a non-anionic initiator. However, preferably, an anionic initiator containing an alkali metal such as lithium, or an alkaline-earth metal such as barium is used.

Suitable organolithium initiators include, in particular, those comprising one or more carbon-lithium bonds. Mention may be made, for example, of aliphatic organolithiums, such as ethyllithium, n-butyllithium (nBuLi), isobutyllithium, and dilithium polymethylenes, such as 1-4 dilithiobutane. Lithium amides, which are obtained from an acyclic or cyclic secondary amine, such as pyrrolidine or hexamethyleneimine, may also be used.

Also, diene elastomers useful in the present invention include diene elastomers which are initiated by compounds of transition metals, such as compounds of titanium for example, or by rare earths, such as neodymium.

The polymerization, as is known to a person skilled in the art, is preferably effected in the presence of an inert solvent, which may be, for example, an aliphatic or alicyclic hydrocarbon such as pentane, hexane, iso-octane, cyclohexane, methylcyclohexane, cyclopentane, or an aromatic hydrocarbon such as benzene, toluene or xylene. This polymerization may be effected continuously or discontinuously. It is generally effected at a temperature of between 20° C. and 120° C., preferably between 30° C. and 100° C.

The functionalization of the diene elastomers, obtained by COOH functions along the chain, may advantageously be effected according to the process described in French Patent Application Serial No. 99/05746 (assigned to the Assignee of the present invention), which relates generally to the functionalization of any polymers comprising at least one double bond, for example polymers obtained from monomers such as isoprene, butadiene, isobutylene, a vinyl-aromatic compound or terpolymers of ethylene, propylene and a diene.

This process comprises: (1) a first step, wherein the starting polymer is subjected to a hydroalumination or carboalumination reaction along its chain in an inert hydrocarbon solvent, by the addition of an agent derived from aluminum to the starting polymer; (2) a second step of adding to the product of the reaction of the first step at least one electrophilic agent intended to react with the agent derived from aluminum; and (3) a third step of later stopping the functionalization reaction of the second step and recovering the polymer functionalized along its chain.

The hydroalumination or carboalumination reactions of the first step of the process involve the addition of an Al—H or an Al—C bond, respectively, to a double bond of the starting polymer in accordance with the reactions Al—H+C═C→H—C—C—Al or Al—C+C═C→C—C—C—Al, respectively. In order to implement these reactions, in particular, an alkyl aluminum or an aluminate may be used as the agent derived from aluminum. In preferred embodiments, diisobutyl aluminum hydride is used.

This first step is advantageously implemented in an inert hydrocarbon solvent, such that the number of moles of the agent derived from aluminum per 1000 grams of starting polymer is between 0.05 and 5 moles, and preferably between 0.05 and 0.5 mole. In particular, toluene, xylene, heptane, or cyclohexane may be used as the inert hydrocarbon solvent. Preferably, this first step is implemented at a temperature of between 20° C. and 100° C. and, even more preferably, between 50° C. and 70° C.

To implement the second step of the process, anhydrides, in particular, carbon dioxide, are preferably used as the electrophilic agent to obtain a polymer having carboxylic acid functions along the chain. A cyclic anhydride may also be used, such as succinic anhydride. This second step is advantageously implemented such that the molar ratio of the number of moles of electrophilic agent to the number of moles of agent derived from aluminum is equal to or greater than 3. Preferably, this second step is implemented at a temperature of between 20° C. and 100° C. and, even more preferably, between 50° C. and 70° C.

For stopping the functionalization reaction of this second step, there is preferably added a metallic complexing agent which also has the effect of liquefying the reaction medium. This complexing agent preferably comprises a metallic chelate capable of releasing at least one proton during the complexing reaction. Preferably, acetylacetone is used as the chelate. Benzoyl acetone or 8-hydroxyquinoline may also be used. The molar ratio of the number of moles of the metallic complexing agent to the number of moles of agent derived from aluminum is then equal to or greater than 3.

In the case of carboxylic acid functionalization where carbon dioxide is used as the electrophilic agent, following the addition of the metallic complexing agent, there is added to the reaction medium a highly protonic acid to finish the stopping of the functionalization. This highly protonic acid may be, for example, hydrochloric acid. The molar ratio of the number of moles of highly protonic acid to the number of moles of agent derived from aluminum is then equal to or greater than 3.

For the carboxylic acid functionalization of a diene elastomer, such as a styrene-butadiene copolymer prepared in emulsion, there may be used as the functionalizing agent an unsaturated aliphatic monocarboxylic or dicarboxylic acid, for example, acrylic acid, maleic acid or fumaric acid, or, alternatively, a carbocyclic carboxylic acid, such as cinnamic acid.

Of course, the compositions of the invention may contain a single diene elastomer such as the aforementioned one or a mixture of several of these diene elastomers.

The diene elastomers according to the present invention, having COOH functions along the chain, may be used on their own in the composition according to the invention, or may be used in a blend with any other elastomer conventionally used in tires, such as natural rubber or a blend based on natural rubber and a synthetic elastomer, or alternatively another diene elastomer which may possibly be coupled and/or starred or alternatively partially or entirely functionalized other than with COOH functions along the chain.

It will be noted that the improvements in the properties of the rubber composition according to the invention will be greater as the proportion of said conventional elastomer(s) is lower in the composition according to the invention. Advantageously, this or these conventional elastomer(s) may be present in the composition according to the invention, if applicable, in a quantity of from 1 to 70 parts by weight per 100 parts by weight of diene elastomer(s) according to the invention having COOH functions along the chain.

In the present application, "reinforcing inorganic filler", in a known manner, is understood to mean an inorganic or mineral filler, whatever its color and its origin (natural or synthetic), which may also be referred to as a "white" filler or a "clear" filler, in contrast to carbon black. This inorganic filler is capable, on its own, without any means other than an intermediate coupling agent, of reinforcing a rubber composition intended for the manufacture of tires. In other words, this inorganic filler is capable of replacing a conventional tire-grade carbon black filler in its reinforcement function.

Preferably, the reinforcing inorganic filler is present in the composition of the invention in a quantity equal to or greater than 40 phr (phr: parts by weight per hundred parts of diene elastomer(s)). Also preferably, this reinforcing inorganic filler is present in a majority proportion in the reinforcing filler of the composition of the invention, such that its mass fraction in said reinforcing filler is greater than 50%.

Advantageously, the entirety (or at the very least a majority proportion) of said reinforcing inorganic filler is silica ($SiO_2$). The silica used may be any reinforcing silica known to the person skilled in the art, in particular, any precipitated or pyrogenic silica having a BET surface area and a specific CTAB surface area both of which are less than 450 $m^2/g$, even if the highly dispersible precipitated silicas are preferred.

In the present specification, the BET specific surface area is determined in a known manner, in accordance with the method described in Brunauer et al., *Journal of the American Chemical Society*, vol. 60, page 309 (February 1938) and corresponding to Standard AFNOR-NFT-45007 (November 1987). The CTAB specific surface area is the external surface area determined in accordance with the same Standard AFNOR-NFT-45007 of November 1987.

"Highly dispersible silica" is understood to mean any silica having a substantial ability to disagglomerate and to disperse in an elastomeric matrix, which can be observed in known manner by electron or optical microscopy on thin sections. Non-limiting examples of such preferred highly dispersible silicas include: the silica Perkasil KS 430, commercially available from Akzo; the silica BV 3380, commercially available from Degussa; the silicas Zeosil 1165 MP and 1115 MP, commercially available from Rhodia; the silica Hi—Sil 2000, commercially available from PPG; the silicas Zeopol 87 or 8745, commercially available from Huber; and treated precipitated silicas such as, for example, the aluminum-"doped" silicas described in European Pat. No. EP 0 735 088.

The physical state in which the reinforcing inorganic filler is present is immaterial, whether it be in the form of a powder, microbeads, granules or balls. Of course, "reinforcing inorganic filler" is also understood to mean mixtures of different reinforcing inorganic fillers, in particular of highly dispersible silicas such as those described above.

It will be noted that the reinforcing filler of a rubber composition according to the present invention may contain carbon black in a blend or mixture, in addition to the aforementioned reinforcing inorganic filler or fillers, in a minority proportion (that is to say, in a mass fraction of less than 50%). Any carbon black may be suitable including, in particular, the blacks of the type HAF, ISAF and SAF, which are conventionally used in tires, and particularly in tire treads. Non-limiting examples of such blacks include the blacks N115, N134, N234, N339, N347 and N375.

For example, black/silica blends or blacks partially or integrally covered with silica are suitable for forming the reinforcing filler. Also suitable are reinforcing inorganic fillers comprising carbon blacks modified by silica such as, for example, the fillers sold by CABOT under the name "CRX 2000", which are described in International Patent Publication No. WO 96/37547.

The following may also be used, for example, as the reinforcing inorganic filler: aluminas (of the formula $Al_2O_3$), such as the aluminas of high dispersibility which are described in European Pat. No. EP 0 810 258; or aluminum hydroxides, such as those described in International Patent Publication No. WO 99/28376.

In embodiments where the reinforcing filler contains only a reinforcing inorganic filler and carbon black, the mass fraction of the carbon black in the reinforcing filler preferably is less than or equal to 30%.

However, the aforementioned properties of the composition according to the present invention are improved all the more, the higher the mass fraction of reinforcing inorganic filler is in the reinforcing filler which makes up part of the composition of the present invention. These properties are optimal when the composition contains solely a reinforcing inorganic filler, for example, silica, as the reinforcing filler. Thus, it is preferred in certain embodiments of the present invention for the rubber composition to contain solely a reinforcing inorganic filler (for example, silica) as the reinforcing filler.

The rubber composition according to the invention also comprises, in conventional manner, a reinforcing inorganic filler/elastomeric matrix bonding agent (also referred to as coupling agent), the function of which is to ensure sufficient chemical and/or physical bonding (or coupling) between the inorganic filler and the elastomeric matrix, while facilitating the dispersion of this inorganic filler within said matrix.

"Coupling agent" is more precisely understood to mean an agent capable of establishing a sufficient chemical and/or physical connection between the particular filler and the elastomer, while facilitating the dispersion of the filler within the elastomeric matrix. Such a coupling agent, which is at least bifunctional, may have, for example, the simplified general formula "Y-T-X", wherein: (1) Y represents a functional group ("Y function") which is capable of bonding physically and/or chemically with the inorganic filler, where such a bond may be established, for example, between a silicon atom of the coupling agent and the hydroxyl (OH) surface groups of the inorganic filler (for example, the surface silanols in the case of silica); (2) X represents a functional group ("X function") which is capable of bonding physically and/or chemically with the elastomer, for example, by means of a sulfur atom; and (3) T represents a group linking Y and X.

The coupling agents must not be confused with simple agents for covering the particular filler, where such simple covering agents, in known manner, may comprise the Y function, which is active with respect to the filler, but are devoid of the X function which is active with respect to the elastomer.

Such coupling agents, of variable effectiveness, have been described in a large number of documents and are well-known to the person skilled in the art. In fact, any known coupling agent known to or likely to ensure, in the diene rubber compositions which can be used for the manufacture of tires, the effective bonding or coupling between a reinforcing inorganic filler, such as silica, and a diene elastomer may be used. For example, organosilanes, particularly polysulfurized alkoxysilanes or mercaptosilanes, or polyorganosiloxanes bearing the X and Y functions mentioned above may be used.

Silica/elastomer coupling agents in particular have been described in a large number of documents, where the best known of such coupling agents are bifunctional alkoxysilanes such as polysulfurized alkoxysilanes. In particular, polysulfurized alkoxysilanes, which are referred to as "symmetrical" or "asymmetrical" depending on their specific structure, may be used, such as those described, for example, in U.S. Pat. Nos. 3,842,111; 3,873,489; 3,978,103; 3,997,581; 4,002,594; 4,072,701; and 4,129,585, or in the more recent U.S. Pat. Nos. 5,580,919; 5,583,245; 5,650,457; 5,663,358; 5,663,395; 5,663,396; 5,674,932; 5,675,014; 5,684,171; 5,684,172; 5,696,197; 5,708,053; and 5,892,085; and European Pat. No. EP 1 043 357, all of which describe such known compounds in detail.

Particularly suitable for implementing the present invention (without the definition below being limiting) are symmetrical polysulfurized alkoxysilanes, which satisfy the following general formula (I):

$$Z\text{-}A\text{-}S_n\text{-}A\text{-}Z \qquad (I)$$

wherein:

n is an integer from 2 to 8 (preferably from 2 to 5); A is a divalent hydrocarbon radical (preferably $C_1$-$C_{18}$ alkylene groups or $C_6$-$C_{12}$ arylene groups, more particularly $C_1$-$C_{10}$ alkylenes, more particularly $C_1$-$C_4$ alkylenes, more particularly propylene); and Z corresponds to one of the formulae below:

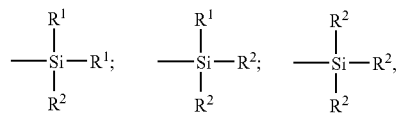

wherein:

the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl); and the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulfurized alkoxysilanes in accordance with Formula (I) above, particularly conventional, commercially available mixtures, it will be understood that the average value of "n" is a fractional number, preferably within the range of from 2 to 5.

Polysulfurized alkoxysilanes appropriate for use herein include: the polysulfides (in particular, disulfides, trisulfides or tetrasulfides) of bis-(alkoxyl($C_1$-$C_4$)-alkyl($C_1$-$C_4$)silylalkyl($C_1$-$C_4$)), such as, for example, the polysulfides of bis(3-trimethoxysilylpropyl) or of bis(3-triethoxysilylpropyl). Of these compounds, preferably bis(3-triethoxysilylpropyl) tetrasulfide, abbreviated TESPT, of the formula $[(C_2H_5O)_3Si(CH_2)_3S_2]_2$, or bis(triethoxysilylpropyl) disulfide, abbreviated TESPD, of the formula $[(C_2H_5O)_3Si(CH_2)_3S]_2$, are used. TESPD is commercially available, for example, from Degussa under the names Si266 or Si75 (in the latter case, in the form of a mixture of disulfide (75% by weight) and of polysulfides), or alternatively from Witco under the name Silquest A1589. TESPT is commercially available, for example, from Degussa under the name Si69 (or X50S when it is supported to 50% by weight on carbon black), or alternatively from Osi Specialties under the name Silquest A1289 (in both cases, a commercial mixture of polysulfides having an average value of n which is close to 4).

The compositions according to the invention also comprise, in addition to the diene elastomers having carboxylic acid functions along the chain and said reinforcing inorganic filler, plasticizers, pigments, antioxidants, anti-ozone waxes, a cross-linking system based on sulfur and/or on peroxide and/or on bismaleimides, cross-linking activators comprising zinc monoxide and stearic acid, extender oils, one or more agents for covering the silica, such as alkoxysilanes, polyols or amines.

In particular, these compositions may be such that the diene elastomer having carboxylic acid functions is extended using a paraffinic, aromatic or naphthenic oil, with a quantity of extender oil of between 0 and 50 phr.

Another subject of the present invention is a process for the preparation of a cross-linkable rubber composition according to the invention. In known manner, such a process comprises:

(1) a first phase of thermomechanical working of the constituents of the composition (with the exception of the cross-linking system) carried out at a maximum temperature of between 130° C. and 200° C., which is followed by (2) a second phase of mechanical working effected at a temperature less than that of the first phase and during which the cross-linking system is incorporated.

The first phase comprises the stages of: (1) mixing together the constituents of the first phase, with the exception of the antioxidant; and (2) incorporating the antioxidant and mixing it with the constituents of the first stage of the first phase. Furthermore, zinc monoxide is conventionally added during the second stage to activate the later cross-linking.

It has been discovered unexpectedly that incorporating all the zinc monoxide during the first stage of thermomechanical working, contrary to conventional methods in which the zinc monoxide is incorporated during the second stage of thermomechanical working, makes it possible to minimize further the hysteresis losses at low deformations of the composition according to the invention in the cross-linked state which corresponds to the above definition. At the same time that the hysteresis losses are being minimized, this incorporation of the zinc monoxide during the first stage of thermomechanical working also imparts to the composition according to the present invention processing properties, in the non-cross-linked state, which are still improved compared with the processing properties of compositions based on known functional elastomers and processing properties which are comparable to the processing properties of compositions according to the invention where the incorporation of zinc monoxide occurs during the second stage of thermomechanical working.

It has also been discovered unexpectedly that the incorporation of magnesium monoxide during the first stage of thermomechanical working makes it possible to minimize further the hysteresis losses at low and high deformations of the composition according to the invention in the cross-linked state corresponding to the aforementioned definition, while imparting to the composition according to the invention processing properties in the non-cross-linked state which are similar to the processing properties of compositions based on non-functional elastomers.

Another subject of the present invention is a tread for a tire, where the tread comprises a cross-linkable or cross-linked rubber composition according to the invention described in detail above or where the tread is formed of this composition. Because of the reduced hysteresis that characterizes a rubber composition according to the present invention in the cross-linked state, it will be noted that a tire, where the tread of the tire comprises the composition of the present invention, has the advantage of reduced rolling resistance. Thus, another subject of the present invention includes a tire, such that the tire comprises the tread made up of the composition of the present invention.

The aforementioned characteristics of the present invention, as well as others, will be better understood upon reading the following description of several examples of embodiments of the invention, which are given by way of illustration and not of limitation.

EXAMPLES

For the polymers described herein, the viscosities indicated are inherent viscosities which are measured at a concentration of 1 g/L in toluene at 25° C.

The following experimental techniques were used in characterizing the polymers obtained:

a) The SEC technique (size exclusion chromatography technique) was used to determine the distributions of molecular weights relative to samples of these polymers. Starting from standard products whose characteristics are described in Example 1 of European Pat. No. EP 0 692 493, this technique made it possible to evaluate, for a sample, a number-average molecular weight ($M_n$) which has a relative value, unlike the one determined by osmometry, and also a weight-average molecular weight ($M_w$). The polydispersity index ($I_p = M_w/M_n$) of the sample was deduced therefrom.

According to this technique, the macromolecules are separated physically according to their respective sizes when swollen, in columns filled with a porous stationary phase. Before implementing this separation, the sample of polymer is solubilized at a concentration of about 1 g/L in tetrahydrofuran.

A chromatograph sold under the name/model "WATERS 150C" was used for the aforementioned separation. The elution solvent was tetrahydrofuran, the flow rate was 1 mL/min, the temperature of the system was 35° C. and the duration of analysis was 30 minutes. A set of two "WATERS" columns is used, the type being "STYRAGEL HT6E".

The injected volume of the solution of the polymer sample was 100 μL. The detector used was a "WATERS R401" differential refractometer. Software for processing the chromatographic data was also used, the trade name of which is "WATERS MILLENNIUM".

b) Additionally, with the aim of calculating the amount of COOH functions (in meq/kg of polymer) and the number of corresponding functional units per chain of polymer, a metering method using the $^1H$ NMR technique was used, after esterification with an excess of diazomethane, which reagent is known to react with COOH functions.

More precisely, this method consists of using diazomethane, methyl ester functions from the COOH functions which have been fixed to the elastomer, in order to provide access indirectly and quantitatively to the amounts of COOH functions by $^1H$ NMR. The diazomethane is prepared as follows: It is obtained by action of alcoholic potassium hydroxide solution on N-methyl-N-nitrosoparatoluenesulfonamide, in the presence of diethyl ether at the temperature of melting ice. Then the ether phase containing the reagent is recovered by simple distillation.

The esterification reaction is then carried out in the following manner: A sample of the elastomer which has been washed and dried in a specific manner is solubilized in toluene, so as to be able to characterize it by analysis. This specific preparation consists of treating the elastomer by three successive dissolution operations in toluene, respectively, followed by coagulation operations in a mixture formed of acetone and water and which is acidified to pH=2 with hydrochloric acid, in order to eliminate any traces of acidic compounds (stopper, antioxidant, catalytic residues, by-products such as isovaleric acid, in particular). Then the elastomer thus treated is dried in an oven at 50° C., in a vacuum and under a nitrogen atmosphere.

Then, the ethereal solution containing the diazomethane is added thereto, such that there is an excess of reagent relative to the COOH functions. The polymer thus treated is subsequently coagulated in methanol, then redissolved twice in toluene and methanol to coagulate it. The polymer is then dried in a desiccator at ambient temperature and under a high vacuum by means of a vane pump.

$^1H$ NMR analysis is then performed in the following manner: A sample of the polymer, esterified in the manner described above, is solubilized in carbon disulfide. The $^1H$ NMR signal is analyzed using a spectrometer commercially available under the name BRUKER AC200. The characteristic signal of the three methyl protons of COOCH$_3$ provides quantitative access to the initial proportion of COOH functions in the functional polymer.

In the following examples, the properties of the compositions according to the present invention were evaluated as follows:

The Mooney viscosity ML(1+4) at 100° C., was measured in accordance with ASTM Standard D-1646 and is referred to as Mooney in the tables.

The Moduli of elongation at 300% (ME 300), at 100% (ME 100) and at 10% (ME 10) were measured. These measurements were taken in accordance with Standard ISO 37.

The Scott break indices were measured at 20° C., while the Breaking load (BL) was measured in MPa. The elongation at break (EB) was measured in %.

The hysteresis losses (HL) were measured by rebound at 60° C. in %. The deformation for the losses measured is about 40%. The Shore A hardness measurements were taken in accordance with Standard DIN 53505.

The dynamic shear properties measurements are taken as a function of the deformation and are performed at 10 Hertz with a peak-to-peak deformation of from 0.15% to 50%. The non-linearity expressed is the difference in the shear modulus between 0.15% and 50% deformation, in MPa. The hysteresis is expressed by the measurement of tan δ max. at 23° C. in accordance with Standard ASTM D2231-71 (reapproved in 1977).

Example 1

Preparation of Styrene/butadiene Copolymers (SBR), Whether Functionalized or Not (A) Preparation Discontinuously and in Solution of a Non-Functional SBR ("S-SBR A"):

In the first phase, a styrene/butadiene copolymer was prepared by injecting 167 grams of styrene, 476 grams of butadiene and 2000 ppm of tetrahydrofuran (THF) into a 10 liter reactor containing 6.4 liters of deaerated heptane. The impurities are neutralized using n-BuLi. Then 0.0038 mol of n-BuLi and 0.0011 mol of sodium tert. butylate used as randomizing agent were added. The polymerization was carried out at 55° C.

In the second phase, at 90% conversion, 0.006 mol of methanol was injected into the reactor. The polymer solution was stirred for 15 minutes at 55° C. The polymer was antioxidized by the addition of 0.8 phr of 2,2'-methylene bis(4-methyl-6-tert. butylphenol) and 0.2 phr of N-(1,3-dimethylbutyl)-N'-p-phenylenediamine. The polymer was then recovered by steam stripping and dried on an open mill at 100° C.

The S-SBR A thus obtained had the following characteristics:

| | |
|---|---|
| Incorporated styrene | 26% by weight |
| Number of vinyl units of the butadiene fraction | 41% |
| Viscosity measured in toluene at 25° C. (dL/g) | 1.4 |
| Mooney viscosity ML(1 + 4, 100° C.) | 26 |
| $M_n$ measured by osmometry | 155,000 g/mol. |
| polydispersity index | 1.07. |

(B) Preparation Discontinuously and in Solution of a Functionalized SBR by Reaction with Hexamethylcyclotrisiloxane ("S-SBR B"):

In the first phase, operation was under conditions identical to those described in Example 1(A) above for the preparation of the S-SBR A.

In the second phase, at 90% conversion, an aliquot part was taken from the reactor, and the reaction was stopped by adding methanol. The viscosity of the polymer was then measured to be 1.4 dL/g. Then, 0.0013 mol of hexamethylcyclotrisiloxane (D3) was injected into the remaining contents of the reactor. The polymer solution was stirred for 15 minutes at 55° C. The polymer was antioxidized by the addition of 0.8 phr of 2,2'-methylene bis(4-methyl-6-tert. butylphenol) and 0.2 phr of N-(1,3-dimethylbutyl)-N'-p-phenylenediamine. The polymer was then recovered by steam stripping and was dried on an open mill at 100° C.

The S-SBR B thus obtained had the following characteristics:

| | |
|---|---|
| Incorporated styrene | 26% by weight |
| Number of vinyl units of the butadiene fraction | 41% |
| Viscosity measured in toluene at 25° C. (dL/g) | 1.4 |
| Mooney viscosity ML(1 + 4, 100° C.) | 26 |
| $M_n$ measured by osmometry | 155,000 g/mol. |
| Polydispersity index | 1.07. |

The amount of functionalized chains was measured by $^1$H NMR, after purification of the polymer sample by a series of three coagulation operations in methanol, redissolving in toluene. This amount of functionalized chains is expressed by means of this technique in milli-equivalents per kilogram of polymer (meq/kg). The $^1$H NMR spectrum was characterized by blocks at 0 and –0.1 ppm corresponding to the —Si(CH$_3$)$_2$—OH group. For the S-SBR B, $^1$H NMR analysis provided an amount of functions of 4.5 meq/kg which, taking into account the molecular weight $M_n$ of the polymer, corresponds to approximately 70% of functionalized chains.

(C) Preparation Discontinuously and in Solution of Several SBR's Comprising Carboxylic Acid Functions Along the Chain ("S-SBR C", S-SBR D" and "S-SBR E"):

In this example, the number-average molecular weights ($M_n$) of the starting polymers and the corresponding functional polymers were determined precisely by osmometry. The aforementioned SEC technique was also used to determine the distributions of molecular weights relative to samples of these polymers.

Each of the three functional copolymers S-SBR C, S-SBR D and S-SBR E was prepared using the same deoxygenated solution of a starting styrene/butadiene copolymer, the number-average molecular weight of which, determined by osmometry, was $M_n$=180,000 g/mole and the polydispersity index of which, determined by the SEC technique, was $I_p$=1.09.

The percentages of styrene, of 1,4-cis linkages, of 1,4-trans linkages and of 1,2 linkages of this starting copolymer were 25%, 28%, 32% and 40%, respectively.

Furthermore, this starting solution contained 0.2 phr of the antioxidant N-1,3-dimethylbutyl-N'-phenyl-p-phenylenediamine and 0.2 hr of the antioxidant 2,2'-methylene-bis (4-methyl-6-t. butylphenol).

In accordance with techniques known to the person skilled in the art and under the conditions mentioned in Table 1 below, there was introduced, at ambient temperature into a 10 liter reactor containing 7 liters of said deoxygenated solution, the necessary quantity of a molar toluene solution of diisobutylaluminum hydride (HDiBA), the weight fraction of the polymeric solution in the toluene being 10%.

The reaction medium was stirred for 10 minutes in order to homogenize it sufficiently. Then, the stirring was stopped and the hydroalumination was effected under static conditions at 65° C. for 64 hours.

It will be noted that the value of the ratio of the number of moles of HDiBA to kg of polymer was varied in order to prepare the three functional elastomers S-SBR C, S-SBR D and S-SBR E. Thus, this ratio was 0.05 mol/kg, 0.1 mol/kg and 0.2 mol/kg for S-SBR C, S-SBR D and S-SBR E, respectively.

The second method consisted of effecting metering in accordance with the $^1$H NMR technique described above in Section "b)" (beginning with paragraph 87 herein).

The results obtained are set forth in Table 1 below, which refers to the starting styrene-butadiene copolymer and to the three copolymers S-SBR C, S-SBR D and S-SBR E which were hydroaluminized and functionalized. The amounts of COOH functions and the numbers of COOH units per chain were determined in accordance with one or the other of the above two methods indicated in Table 1 below.

TABLE 1

| | Hydroalumination (No. moles of HDiBA/kg SBR) | Mooney viscosity ML (1 + 4) | Inherent viscosity (dL/g) | $M_n$ (SEC) g/mole | $I_p$ (SEC) | $T_g$ (° C.) | Amount of COOH functions (meq/kg) No. COOH units/chain | |
|---|---|---|---|---|---|---|---|---|
| | | | | | | | Aci- dimetry | Esterification and $^1$H NMR |
| Starting S-SBR | | 30 | 1.43 | 138000 | 1.09 | −40 | | |
| S-SBR C | 0.05 | 32 | 1.51 | 132000 | 1.11 | −40 | 4 meq/kg 1 unit | 5 meq/kg 1 unit |
| S-SBR D | 0.1 | 34 | 1.48 | 139000 | 1.11 | −39 | 22 meq/kg 4 units | 21 meq/kg 4 units |
| S-SBR E | 0.2 | 38 | 1.42 | 140000 | 1.11 | −38 | 44 meq/kg 8 units | 40 meq/kg 7 units |

Then the functionalization was effected in the same reactor at 65° C. and for 6 hours, by means of pressurization of 6 bars with carbon dioxide. This functionalization was performed under identical operating conditions for the preparation of the elastomers S-SBR C, S-SBR D and S-SBR E.

Then, the reaction was stopped, first with acetylacetone in a molar ratio of acetylacetone/aluminum of 12, and then with hydrochloric acid in a molar ratio of hydrochloric acid/aluminum of 7.5. Subsequently, the elastomer solution obtained was treated with 0.3 phr of an antioxidant consisting of 2,2'-methylene-bis(4-methyl-6-t. butylphenol). Then stripping, preferably with steam, was effected in acidic medium (pH=2). Then, the elastomer was re-dissolved in toluene, with concentrated aqueous hydrochloric acid, such that the molar ratio of hydrochloric acid/aluminum is equal to 5.

Then, a second stripping in acidic medium was effected in order to be able to eliminate the residual isovaleric acid completely. Isovaleric acid is a by-product of the carboxylation of the isobutyl radicals contained in the HDiBA.

The elastomer thus treated was then drained on a open mill at 100° C., and was dried in a vacuum at 60° C. (with an inert nitrogen atmosphere) for 18 hours.

The amount of carboxylic acid functions was calculated (in meq/kg of polymer), and the number of corresponding functional units per chain of copolymer was calculated (with $M_n$=180,000 g/mole, determined by osmometry) using two different, methods for each of these two calculations.

The first method consisted of metering the carboxylic acid functions by acidimetry and calculating, on one hand, the amount of these COOH functions per kg of polymer and, on the other hand, the number of units per chain on the basis of a $M_n$ (determined by osmometry) of 180,000 g/mole.

This metering by acidimetry was effected by dissolving a sample of the elastomer thus prepared in a mixture of toluene and orthodichlorobenzene. The COOH functions are neutralized in the presence of pyridine, with a solution of tetrabutylammonium hydroxide in isopropanol. The equivalence is detected by potentiometry.

It will be noted that the functional polymers S-SBR C, S-SBR D and S-SBR E obtained have a macrostructure which is practically identical to that of the starting polymer, as shown by the results of the distribution of the molecular weights (the polydispersity indices, $I_p$).

(D) Preparation in Emulsion of a Non-Functional SBR ("E-SBR F"):

The polymerization operations in this example were effected at 5° C. with stirring, in 250 mL Steinie bottles, in accordance with methods known to the person skilled in the art. The water used was deionized and bubbled through in a current of nitrogen to eliminate any trace of dissolved oxygen.

An emulsifying solution consisting of 5.45 grams of n-dodecylamine, 1.59 grams of acetic acid and 543.5 mL of water was introduced into a 750 mL Steinie bottle, which had previously been bubbled through with nitrogen. This emulsifying solution was heated to 60° C. and was stirred until the n-dodecylamine has completely dissolved.

Then, 6.5 mL of a solution of 100 g/L KCl, 6.5 mL of a solution of 100 g/L $AlCl_3$ and 23 mL of a molar solution of hydrochloric acid were added to this bottle.

45 mL of this stock solution was placed in a 250 mL Steinie bottle and cooled to 5° C. Then, 13 grams of liquid butadiene and 12 grams of styrene were added thereto. The whole was stirred in a tank at 5° C. until a stable emulsion formed. Finally, 2 mL of a solution of 31.25 g/L n-dodecylmercaptan and 14.25 g/L paramenthane hydroperoxide was added, and the polymerization was started at 5° C. with stirring. The polymerization was stopped after 6 hours and 30 minutes by adding 0.025 grams of hydroquinone.

10 grams of NaCl per 100 grams of elastomer was added to this emulsion, and the mixture was stirred for several minutes. Then, 150 mL of toluene and 1 phr of an antioxidant mixture comprising 80% of the product named "AO2246" and 20%

N-(1,3-dimethylbutyl)-N'-phenyl-p-phenylenediamine (commonly called "6PPD") were added. The solution was stirred once again. It was finally stripped, and the polymer was dried at between 30 and 50° C.

15 g of a polymer having the characteristics indicated below in Table 2 were obtained.

TABLE 2

| ML (1 + 4) | Viscosity | $M_n$(SEC) | $I_p$ | $T_g/\Delta T$ (° C.) | % Butadiene** (1,4) trans | (1,4) cis | % styrene* |
|---|---|---|---|---|---|---|---|
| 45 | 1.8 | 129443 | 3.72 | −33/8 | 73.1 | 13.3 | 41.2 |

*This percentage is a mass percentage
**These percentages are mass percentages relative to the incorporated butadiene.

(E) Preparation in Emulsion of an SBR Comprising Carboxylic Acid Functions Along the Chain ("E-SBR G"):

The procedure followed was as described in Example 1(D) above, except that 55 meq/kg of monomers of acrylic acid was added to the emulsifying solution, at the same time as the KCl and the AlCl$_3$.

The polymerization was stopped after 18 hours by adding 0.025 grams of hydroquinone. The polymer was recovered in the same manner as described in Example 1(D) above. 15 g of a polymer having the characteristics indicated below in Table 3 were obtained.

TABLE 3

| ML (1 + 4) | Viscosity | $M_n$(SEC) | $I_p$ | $T_g/\Delta T$ (° C.) | % Butadiene** (1,4) trans | (1,4) cis | % styrene* | —COOH (meq/kg) |
|---|---|---|---|---|---|---|---|---|
| 49 | 1.76 | 110345 | 3.23 | −32/7 | 75 | 12 | 39 | 30 |

Furthermore, the E-SBR G thus obtained has a total quantity of emulsifier which is less than 3 phr, as the treatment of the polymer obtained by solubilization and stripping has the effect of reducing the final quantity of emulsifier in the E-SBR G.

(F) Preparation in Emulsion of a Non-functional SBR Extended with Oil ("E-SBR H"):

The polymerization operations were effected at 5° C. with stirring, in a 10 liter stainless steel reactor, in accordance with the methods known to the person skilled in the art. The water used was deionized and bubbled through in a current of nitrogen to eliminate any trace of dissolved oxygen.

An emulsifying solution consisting of 37.19 grams of n-dodecylamine, 10.95 grams of acetic acid and 540 mL of water was introduced into a 750 mL Steinie bottle, bubbled through with nitrogen. This emulsifying solution was heated to 60° C. and stirred until the n-dodecylamine had completely dissolved.

3 liters of water was added to the 10 liter reactor and was bubbled through under nitrogen for 30 minutes. All the soap solution was introduced into the reactor, as was 90 mL of a solution of 50 g/L KCl, 90 mL of a solution of 100 g/L AlCl$_3$, 114 mL of a solution of 14 g/L FeCl$_2$ and 177 mL of a molar solution of hydrochloric acid.

The reactor was cooled to 12° C. and 1164 grams of butadiene and 1006 grams of styrene were added thereto. The temperature of the reactor was lowered to 5° C. After 5 minutes' stirring, 2.55 grams of paramenthane hydroxide and 10.52 grams of mercaptan both diluted in 68 grams of styrene were added.

After 9 hours, the polymerization was stopped by adding 128 ML of a solution of 40 g/L hydroquinone. There was added thereto, successively, with stirring, 7 liters of toluene, 15 phr NaCl (15 g per 100 g of elastomer), another 7 liters of toluene and 1 phr of a mixture of antioxidants composed of 80% of the product "AO 2246" and 20% "6PPD". The solution obtained was stripped and dried. The final conversion was 74%.

The polymer was then solubilized in toluene and extended with 27.5 phr of an aromatic oil sold by BRITISH PETROLEUM under the name "EXAROL." The polymer was finally dried in an oven in a vacuum at a temperature of between 40 and 50° C.

The characteristics of the polymer obtained are indicated in Table 4 below.

TABLE 4

| ML (1 + 4) | Viscosity | $M_n$(SEC) | $I_p$ | $T_g/\Delta T$ (° C.) | % Butadiene** (1,4) trans | (1,4) cis | (1,2) | % styrene* |
|---|---|---|---|---|---|---|---|---|
| 50 | 2.35 | 124000 | 2.78 | −30 | 75.5 | 11.6 | 12.9 | 41.1 |

(G) Preparation in Emulsion of an SBR Comprising Carboxylic Acid Functions Along the Chain and Extended with Oil ("E-SBR I"):

The procedure for the polymerization was as described in Example 1(F) above, except that 5.78 grams of methacrylic acid was added to the emulsifying solution.

The polymerization was stopped after nine hours and thirty minutes, and the conversion was 70%. Contrary to Example 1(F) above, 27.5 phr of the aromatic oil "EXAROL" was added to the polymer obtained before proceeding with the stripping, and the pH of the stripping water was kept at pH=2.

The polymer was dried in an oven under nitrogen at 30° C. and was used in this form for the rubber properties tests. (See Example 2 below.) The characteristics of the dry polymer included a Mooney viscosity ML(1+4) of the polymer extended with oil of 48. Additional characteristics of the dry polymer are set forth in Table 5 below:

TABLE 5

| Viscosity | $M_n$(SEC) | $I_p$ | $T_g/\Delta T$ (° C.) | % Butadiene** | | | % styrene* | —COOH (meq/kg) |
| --- | --- | --- | --- | --- | --- | --- | --- | --- |
| | | | | (1,4) trans | (1,4) cis | (1,2) | | |
| 2.23 | 108581 | 3.2 | −31/9 | 75.4 | 11.8 | 12.8 | 41.0 | 31 |

Furthermore, the E-SBR I thus obtained had a total quantity of emulsifier which was less than 3 phr, as the treatment of the polymer obtained by solubilization and stripping has the effect of reducing the final quantity of emulsifier in the E-SBR I.

Example 2

Rubber Compositions Comprising an Inorganic Reinforcing Filler and the Aforementioned Elastomers (A) First Comparative Example In this example, five of the elastomers of Example 1 above (specifically, S-SBR A, S-SBR B, S-SBR C, S-SBR D and S-SBR E) were used for the preparation of rubber compositions A, B, C, D and E of the passenger-car-tread type.

Each of these compositions A, B, C, D and E had the following formulation (expressed in phr: parts by weight per hundred parts of elastomer):

| | |
| --- | --- |
| Elastomer | 100 |
| Silica (1) | 80 |
| Aromatic oil ("ENERFLEX 65") | 40 |
| Bonding agent (2) | 6.4 |
| ZnO | 2.5 |
| Stearic acid | 1.5 |
| Antioxidant (3) | 1.9 |
| Anti-ozone wax "C32ST" | 1.5 |
| Sulfur | 1.1 |
| Sulfenamide (4) | 2 |
| Diphenylguanidine | 1.5 | wherein:
(1) = The silica "Zeosil 1165MP" manufactured by Rhodia;
(2) = The bonding agent "Si69" from Dégussa;
(3) = N-(1,3-dimethylbutyl)-N'-phenyl-p-phenylendediamine; and
(4) = N-cyclohexyl-2-benzothiazylsulfenamide.

wherein:

(1)=The silica "Zeosil 1165MP" manufactured by Rhodia;

(2)=The bonding agent "Si69" from Dégussa;

(3)=N-(1,3-dimethylbutyl)-N'-phenyl-p-phenylenediamine; and (4)=N-cyclohexyl-2-benzothiazylsulfenamide.

Each of the following compositions was produced, in a first phase of thermomechanical working, by two stages separated by a cooling phase, then, in a second, finishing, phase, by mechanical working.

There were introduced in succession into a laboratory internal mixer of the "Banbury" type, the capacity of which is 400 cm$^3$, which is 70% filled and the initial temperature of which is approximately 90° C., the elastomer, two-thirds of the reinforcing filler, the coupling agent, the diphenylguanidine and the stearic acid. Then, approximately one minute later, the rest of the reinforcing filler, the aromatic oil and the anti-ozone wax "C32ST" were introduced.

The first thermomechanical working stage was performed for 4 to 5 minutes, until a maximum dropping temperature of about 160° C. was achieved. The elastomeric block was then recovered and cooled.

Then, a second stage of thermomechanical working was performed in the same mixer for 3 to 4 minutes, with addition of the antioxidant and the zinc monoxide, until a maximum dropping temperature of about 160° C. was achieved.

The aforementioned first phase of thermomechanical working was thus effected, it being specified that the average speed of the blades during this first phase was 45 rpm.

The mixture thus obtained was recovered and cooled. Then, in an external mixer (homo-finisher), the sulfur and sulfenamide were added at 30° C., by mixing everything for 3 to 4 minutes (This constituted the aforementioned second phase of mechanical working).

The compositions thus obtained were then calendered either in the form of sheets (of a thickness of 2 to 3 mm) or of fine films of rubber in order to measure their physical or mechanical properties, or in the form of profiled elements which can be used directly, after cutting out and/or assembly to the dimensions desired, for example, as semi-finished products for tires, in particular for treads.

The cross-linking was carried out at 150° C. for 40 minutes. The results are set forth in Table 6 below.

TABLE 6

| COMPOSITION | A<br>S-SBR A | B<br>S-SBR B | C<br>S-SBR C<br>1 unit | D<br>S-SBR D<br>4 units | E<br>S-SBR E<br>8 units |
|---|---|---|---|---|---|
| ML(1 + 4) rubber at 100° C. | 26 | 26 | 32 | 34 | 38 |
| Properties in the non-cross-linked state | | | | | |
| ML(1 + 4) at 100° C. ("Mooney mixture") | 53 | 85 | 56 | 64 | 71 |
| Properties in the cross-linked state | | | | | |
| Shore | 65.6 | 58.4 | 63.7 | 61.2 | 62.6 |
| ME10 | 5.52 | 3.66 | 4.77 | 4.23 | 4.33 |
| ME100 | 1.74 | 1.62 | 1.75 | 1.83 | 2.07 |
| ME300 | 1.99 | 2.34 | 2.11 | 2.43 | 2.78 |
| ME300/ME100 | 1.14 | 1.44 | 1.20 | 1.33 | 1.34 |
| Scott break index at 20° C. | | | | | |
| BL | 20.0 | 23.4 | 20.1 | 20.6 | 21.0 |
| EB % | 571 | 533 | 537 | 491 | 483 |
| Losses 60° C.(def. 40%) | 33.0 | 21.3 | 31.3 | 27.3 | 25.7 |
| Dynamic properties as a function of deformation | | | | | |
| Delta G* at 23° C. | 4.03 | 1.16 | 2.50 | 1.14 | 0.61 |
| Tan δ max at 23° C. | 0.352 | 0.229 | 0.297 | 0.213 | 0.163 |

As far as the properties in the cross-linked state are concerned, it will be noted, on one hand, that the ratio ME300/ME100 relating to compositions B, C, D and E (based on S-SBR B, S-SBR C, S-SBR D and S-SBR E, respectively) is greater than that relating to composition A and, on the other hand, that the hysteresis properties (at low and high deformations) are greatly improved compared with those of composition A.

It will also be noted that the compositions C, D and E according to the invention have values of Mooney "mixture" which are distinctly less than that of composition B based on an elastomer functionalized by reaction with hexamethylcyclotrisiloxane. These Mooney values are indicative of a processing ability for the compositions of the invention which is improved compared to that of a composition based on a known functional elastomer.

These Mooney values for compositions C, D and E are close to that of composition A based on a non-functional elastomer S-SBR A. Particularly, the Mooney values for composition C and D are close to that of composition A, while the Mooney value for composition E according to the invention is between those of compositions A and B.

In other words, the elastomers S-SBR C, S-SBR D and S-SBR E which comprise COOH functions along the chain and, more particularly, S-SBR D, impart to compositions filled with silica practically the same rubber properties in the cross-linked state as those imparted to such a composition by a known functional elastomer, and furthermore with a processing ability close to that imparted by a non-functional elastomer.

(B) Second Comparative Example

In this example, the non-functional S-SBR A from Example 1 above was used to prepare a rubber composition A' of the passenger-car-tread type, which is distinguished from the aforementioned composition A in that it furthermore comprises a carboxylic acid.

An attempt was made to compare the properties of the aforementioned composition D according to the present invention with the properties of composition A'.

Each of the compositions A and D had the following formulation (expressed in phr: parts by weight per hundred parts of elastomer):

| | |
|---|---|
| Elastomer | 100 |
| Silica (1) | 80 |
| Aromatic oil ("ENERFLEX 65") | 40 |
| Bonding agent (2) | 6.4 |
| ZnO | 2.5 |
| Stearic acid | 1.5 |
| Antioxidant (3) | 1.9 |
| Anti-ozone wax "C32ST" | 1.5 |
| Sulfur | 1.1 |
| Sulfenamide (4) | 2 |
| Diphenylguanidine | 1.5 | wherein:
(1) = The silica "Zeosil 1165MP" manufactured by Rhodia;
(2) = The bonding agent "Si69" from Dégussa;
(3) = N-(1,3-dimethylbutyl)-N'-phenyl-p-phenylendediamine; and
(4) = N-cyclohexyl-2-benzothiazylsulfenamide.

wherein:
(1)=The silica "Zeosil 1165MP" manufactured by Rhodia;
(2)=The bonding agent "Si69" from Dégussa;
(3)=N-(1,3-dimethylbutyl)-N'-phenyl-p-phenylenediamine; and
(4)=N-cyclohexyl-2-benzothiazylsulfenamide.

More precisely, the carboxylic acid used for composition A' was oleic acid, and it was incorporated in the S-SBR A prior to the addition of the other additives, so as to be able to effect a first joint mastication of the S-SBR A and the oleic acid. The amount of oleic acid which was added to the S-SBR A was 0.62 phr, which corresponds to a stoichiometry of 4 units which are fixed to the elastomer chain, by analogy with the S-SBR D of the invention. (Thus, the composition A' has the formulation shown above for the compositions A and D, furthermore comprising 0.62 phr of oleic acid.)

Each of the following compositions was produced, in a first phase of thermomechanical working, by two stages separated by a cooling phase, then, in a second, finishing, phase, by mechanical working.

There were introduced in succession into a laboratory internal mixer of the "Banbury" type, the capacity of which is 400 cm$^3$, which was 70% filled and the initial temperature of which was approximately 90° C., the elastomer, two-thirds of the reinforcing filler, the coupling agent, the diphenylguanidine and the stearic acid. Then, approximately one minute later, the rest of the reinforcing filler, the aromatic oil and the anti-ozone wax "C32ST" were introduced.

The first thermomechanical working stage was performed for 4 to 5 minutes, until a maximum dropping temperature of about 160° C. was achieved. The elastomeric block was then recovered and cooled.

Then a second stage of thermomechanical working was performed in the same mixer for 3 to 4 minutes, with addition of the antioxidant and the zinc monoxide, until a maximum dropping temperature of about 160° C. was achieved.

The aforementioned first phase of thermomechanical working was thus effected, it being specified that the average speed of the blades of this first phase was 45 rpm.

The mixture thus obtained was recovered and cooled. Then, in an external mixer (homo-finisher), the sulfur and sulfenamide were added at 30° C., by mixing everything for 3 to 4 minutes. (Thus, this constituted the second mechanical working phase.)

The compositions thus obtained were then calendered, either in the form of sheets (of a thickness of 2 to 3 mm) or of fine films of rubber in order to measure their physical or mechanical properties, or in the form of profiled elements which can be used directly, after cutting out and/or assembly to the dimensions desired, for example, as semi-finished products for tires, in particular for treads.

The cross-linking was carried out at 150° C. for 40 minutes. The results are set forth in Table 7 below.

TABLE 7

| COMPOSITION | A<br>S-SBR A | D<br>S-SBR D<br>4 units | A'<br>S-SBR A |
|---|---|---|---|
| ML(1 + 4) rubber at 100° C.<br>Properties in the<br>non-cross-linked state | 26 | 34 | 26 |
| ML(1 + 4) at 100° C.<br>Properties in the<br>cross-linked state | 53 | 64 | 41 |
| Shore | 65.6 | 61.2 | 65.0 |
| ME10 | 5.52 | 4.23 | 5.23 |
| ME100 | 1.74 | 1.83 | 1.73 |
| ME300 | 1.99 | 2.43 | 1.92 |
| ME300/ME100 | 1.14 | 1.33 | 1.11 |
| Scott break<br>index at 20° C. | | | |
| BL | 20.0 | 20.6 | 20.4 |
| EB % | 571 | 491 | 597 |
| Losses 60° C. (def. 40%) | 33.0 | 27.3 | 30.2 |
| Dynamic properties as a<br>function of deformation | | | |
| Delta G* at 23° C. | 4.03 | 1.14 | 3.72 |
| Tan δ max at 23° C. | 0.352 | 0.213 | 0.316 |

As far as the properties in the cross-linked state are concerned, it will be noted, on one hand, that the ratio ME300/ME100 relating to composition A' is very close to that of composition A and, on the other hand, that the hysteresis properties of composition A' are not substantially improved compared with those of composition A.

In the light of these results, it will be noted that the elastomer S-SBR D which comprises COOH functions along the chain imparts to a composition filled with silica a combination of characteristics (including processing ability/properties at low deformations) which is improved overall when compared to the same combination of characteristics relative to composition A' comprising a carboxylic acid.

(C) Third Comparative Example

In this example, the S-SBR B (functionalized by the reaction with hexamethylcyclotrisiloxane) and the S-SBR D of Example 1 above (comprising 4 COOH units along the chain) were used for the preparation of two rubber compositions B' and D', respectively, of the passenger-car-tread type. These compositions B' and D' are distinct from the compositions B and D mentioned above in Example 2(A) only by their respective preparation processes. (Thus, each of these compositions B' and D' has the same ingredients and the same formulation as in the preceding Examples 2(A) and 2(B).)

Each of compositions B' and D' was produced, in a first phase of thermomechanical working, by two stages separated by a cooling phase, then, in a second, finishing, phase, by mechanical working.

There were introduced in succession into a laboratory internal mixer of the "Banbury" type, the capacity of which is 400 cm$^3$, which was 70% filled and the initial temperature of which was approximately 90° C., the elastomer, two-thirds of the reinforcing filler, the coupling agent, the diphenylguanidine and the stearic acid. Then, approximately one minute later, the rest of the reinforcing filler, the aromatic oil and the anti-ozone wax "C32ST" were introduced.

The first thermomechanical working stage was performed for 4 to 5 minutes, until a maximum dropping temperature of about 160° C. was achieved. The elastomeric block was then recovered and cooled.

Then, a second stage of thermomechanical working was performed in the same mixer for 3 to 4 minutes, with addition of the antioxidant and the zinc monoxide, until a maximum dropping temperature of about 160° C. was achieved.

The aforementioned first phase of thermomechanical working was thus effected, it being specified that the average speed of the blades of this first phase was 85 rpm (unlike in the examples of Example 2(A) above).

The mixture thus obtained was recovered and cooled. Then, in an external mixer (homo-finisher), the sulfur and sulfenamide were added at 30° C., by mixing everything for 3 to 4 minutes. (Thus, this constituted the second mechanical working phase.)

The compositions thus obtained were then calendered either in the form of sheets (of a thickness of 2 to 3 mm) or of fine films of rubber in order to measure their physical or mechanical properties, or in the form of profiled elements which can be used directly, after cutting out and/or assembly to the dimensions desired, for example, as semi-finished products for tires, in particular for treads.

The cross-linking was carried out at 150° C. for 40 minutes.

It will be noted that all the zinc monoxide (ZnO) was introduced conventionally in the second stage of thermomechanical working, in order to obtain cross-linkable compositions B' and D'.

In this comparative example, said S-SBR D was also used for the preparation of a composition D" of the passenger-car-tread type, where this composition D" was distinct from the above-mentioned composition D' solely in that the introduction of all the zinc monoxide takes place during the first stage of thermomechanical working, and not, in conventional manner, during the second stage of thermomechanical working. (Thus, this composition D" also has the same ingredients and the same formulation as in Examples 2(A) and 2(B) above.)

An attempt was made to compare the properties of compositions D' and D" according to the invention with each other, on one hand, and with those of composition B', on the other hand. The results are set forth in Table 8 below:

TABLE 8

| COMPOSITION | B'<br>S-SBR B | D'<br>S-SBR D | D"<br>S-SBR D |
|---|---|---|---|
| ML(1 + 4) rubber at 100° C.<br>Properties in the<br>non-vulcanized state | 26 | 34 | 34 |
| ML(1 + 4) at 100° C.<br>("Mooney mixture")<br>Properties in the<br>vulcanized state | 92 | 51 | 49 |
| Shore | 58.1 | 61.3 | 61.2 |
| ME10 | 3.52 | 3.94 | 3.96 |
| ME100 | 1.69 | 1.58 | 1.59 |
| ME300 | 2.31 | 2.03 | 2.08 |
| ME300/ME100<br>Scott break index at 20° C. | 1.37 | 1.29 | 1.31 |
| BL | 23.4 | 20.1 | 22.0 |
| EB % | 533 | 537 | 604 |
| Losses 60° C. (def. 40%)<br>Dynamic properties as<br>a function of deformation | 16.7 | 28.0 | 27.3 |
| Delta G* at 23° C. | 0.78 | 0.84 | 0.58 |
| Tan δ max at 23° C. | 0.186 | 0.193 | 0.172 |

As far as the properties in the cross-linked state are concerned, it will be noted, on one hand, that the ratio ME300/ME100 relating to the preferred composition D" according to the invention is greater than that of the other composition D' according to the invention and, on the other hand, that the hysteresis properties at low deformations of composition D" are improved compared with those of composition D' and also compared with those of composition B' (which is based on a functionalized elastomer by reaction with hexamethylcyclotrisiloxane).

It will also be noted that composition D" according to the invention has a value of Mooney "mix" which is distinctly less than that of composition B'. This Mooney value indicates a processing ability for the composition D" according to the invention which is always improved compared to that of a composition based on a known functional elastomer.

In other words, the elastomer S-SBR D, which comprises COOH functions along the chain, imparts to composition D", which is filled with silica and is obtained by introducing ZnO during the first stage of thermomechanical working, hysteresis properties at low deformations which are improved compared with those hysteresis properties imparted to such a composition by a known functional elastomer, and furthermore has a processing ability which is identical, or even improved, when compared with the processing ability of composition D', which is also based on elastomer S-SBR D, being filled with silica but is obtained by conventional introduction of ZnO during the second stage of thermomechanical working.

(D) Fourth Comparative Example

In this example, the properties of a new composition D''' of the "passenger-car"-tread type based on said S-SBR D were compared with those of compositions A, B' and D' tested in the preceding examples. (See Example 2(C) above for B' and D', where the introduction of the ZnO is during the second stage of thermomechanical working.)

Composition D''' was produced in accordance with the method described in Example 2(C) above for composition D'; however, composition D''' was further characterized in that magnesium oxide (MgO) was added in a quantity of 1.33 phr in one go, right at the beginning of the first stage of thermomechanical working (namely at t=0 minutes in the internal mixer).

The results obtained are set forth in Table 9 below.

TABLE 9

| COMPOSITION | A<br>S-SBR A | B'<br>S-SBR B | D'<br>S-SBR D | D'''<br>S-SBR D |
|---|---|---|---|---|
| ML(1 + 4) 100° C._rubber<br>Properties in the<br>non-vulcanized state | 26 | 26 | 34 | 34 |
| ML(1 + 4) at 100° C.<br>Properties in the<br>vulcanized state | 53 | 85 | 51 | 58 |
| Shore A | 65.6 | 58.1 | 61.3 | 59.9 |
| ME10 (MPa) | 5.52 | 3.52 | 3.94 | 3.60 |
| ME100 (MPa) | 1.74 | 1.69 | 1.58 | 1.80 |
| ME300 (MPa) | 1.99 | 2.31 | 2.03 | 2.49 |
| ME300/ME100<br>Scott break index<br>at 20° C. | 1.14 | 1.37 | 1.29 | 1.38 |
| BL (MPa) | 20.0 | 23.4 | 20.1 | 21.1 |
| EB (%) | 571 | 533 | 537 | 549 |
| Losses 60° C. (def. 40%)<br>Dynamic properties as<br>a function of deformation | 33.0 | 16.7 | 28.0 | 20.3 |
| ΔG* 23° C. (MPa) | 4.03 | 0.78 | 0.84 | 0.26 |
| Tan (δ)$_{max}$ 23° C. | 0.352 | 0.186 | 0.193 | 0.140 |

As far as the properties in the cross-linked state are concerned, it will be noted, on one hand, that the ratio ME300/ME100 relating to composition D''' according to the invention (based on S-SBR D with addition of the MgO during the first stage of thermomechanical working) is substantially identical to that of composition B' and, on the other hand, that the hysteresis properties (losses at 60° C. and tan δ max at 23° C.) are greatly improved when compared with the hysteresis properties of composition A. These results also show that composition D''' makes it possible to obtain hysteresis properties at low and high deformations which are improved compared with those of composition D' but also relative to composition B' for the low deformations.

On the other hand, it would appear that composition D''' has, in the non-cross-linked state, a value of Mooney viscosity of mix which is distinctly less than that of composition B' and substantially close to that of composition A based on a non-functional S-SBR. This composition D''' consequently has a processing ability which is distinctly improved compared with that of the compositions based on conventional functional elastomers.

In other words, composition D''' according to the invention has hysteresis properties at low deformations which are improved compared with those of a composition based on a conventional functional elastomer while considerably improving the hysteresis properties at high deformations (losses at 60° C.) compared with those of composition D' without MgO. This composition D''' furthermore has a processing ability which is close to that of the "control" composition A based on a non-functional elastomer.

(E) Fifth Comparative Example

In this example, the properties of a new composition D'''' of the "passenger-car"-tread type based on said S-SBR D were compared with those of compositions A, B', D' and D''' tested in the preceding examples.

Composition D'''' was produced in accordance with the method described in Example 2(D) above for composition D'''; however, this composition D'''' differed from said composition D''' solely by the fact that the aforementioned 1.33 phr of magnesium oxide (MgO) was added in a single go to the internal mixer during the first stage of thermomechanical working, only when the temperature in the internal mixer had reached 120° C. (i.e., after about 2 to 3 minutes, contrary to composition D''', in which this addition of MgO took place at t=0 minutes).

The results obtained are set forth in Table 10 below:

D'''' according to the invention have hysteresis properties at high deformations which are improved compared with those of compositions A or D'.

(F) Sixth Comparative Example

In this example, the properties of two rubber compositions F and G of the "passenger-car"-tread type were compared, composition F being based on the non-functional E-SBR F of Example 1(D) above and composition G being based on E-SBR G comprising acrylic acid functions along the chain (see Example 1(E) above).

The formulation used for each of these two compositions F and G was the one mentioned in Example 2(A) above.

Each of these two compositions F and G was produced, in a first phase of thermomechanical working, by two stages separated by a cooling phase, then, in a second, finishing, phase, by mechanical working.

There were introduced in succession into a laboratory internal mixer of the "Banbury" type, the capacity of which is 400 cm$^3$, which was 70% filled and the initial temperature of which was approximately 90° C., the elastomer, two-thirds of the reinforcing filler, the coupling agent, the diphenylguanidine and the stearic acid. Then, approximately one minute

TABLE 10

| COMPOSITION | A<br>S-SBR A | B'<br>S-SBR B | D'<br>S-SBR D | D'''<br>S-SBR D | D''''<br>S-SBR D |
|---|---|---|---|---|---|
| ML(1 + 4) 100° C. rubber<br>Properties in the<br>non-vulcanized state | 26 | 26 | 34 | 34 | 34 |
| ML(1 + 4) 100° C.<br>Properties in the<br>vulcanized state | 53 | 92 | 51 | 58 | 58 |
| Shore A | 65.6 | 58.1 | 61.3 | 59.9 | 57.9 |
| ME10 (MPa) | 5.52 | 3.52 | 3.94 | 3.60 | 3.50 |
| ME100 (MPa) | 1.74 | 1.69 | 1.58 | 1.80 | 1.74 |
| ME300 (MPa) | 1.99 | 2.31 | 2.03 | 2.49 | 2.42 |
| ME300/ME100 | 1.14 | 1.37 | 1.29 | 1.38 | 1.39 |
| Scott break index<br>at 20° C. | | | | | |
| BL (MPa) | 20.0 | 23.4 | 20.1 | 21.14 | 19.2 |
| EB (%) | 571 | 533 | 537 | 549 | 505 |
| Losses 60° C. (def. 40%)<br>Dynamic properties as a function<br>of deformation | 33.0 | 16.7 | 28.0 | 20.3 | 20.1 |
| ΔG* 23° C. (MPa) | 4.03 | 0.78 | 0.84 | 0.26 | 0.23 |
| Tan(δ)$_{max}$ 23° C. | 0.352 | 0.186 | 0.193 | 0.140 | 0.138 |

It will be noted that composition D'''' according to the invention makes it possible to obtain properties in the non-cross-linked and cross-linked state which are similar to those of the other composition D''' according to the invention. Consequently, the moment of introduction of the MgO during the first stage of thermomechanical working does not change the Mooney viscosity, the ratio ME300/ME100 and the hysteresis properties obtained with said composition D'''.

In other words, composition D'''' makes it possible to obtain hysteresis properties (tan δ max at 23° C.) which are largely improved compared with those of compositions A, B' and D', with a distinct improvement of the processing ability compared with that of composition B' based on a known functional elastomer. Furthermore, the compositions D''' and later, the rest of the reinforcing filler, the aromatic oil and the anti-ozone wax "C32ST" were introduced.

The first thermomechanical working stage was performed for 4 to 5 minutes, until a maximum dropping temperature of about 160° C. was achieved. The elastomeric block was then recovered and cooled.

Then, a second stage of thermomechanical working was performed in the same mixer for 3 to 4 minutes, with addition of the antioxidant and the zinc monoxide, until a maximum dropping temperature of about 160° C. was achieved.

The aforementioned first phase of thermomechanical working was thus effected, it being specified that the average speed of the blades of this first phase was 85 rpm.

The mixture thus obtained was recovered and cooled. Then, in an external mixer (homo-finisher), the sulfur and sulfenamide were added at 30° C., by mixing everything for 3 to 4 minutes. (Thus, this constituted the second mechanical working phase.)

The compositions thus obtained were then calendered, either in the form of sheets (of a thickness of 2 to 3 mm) or of fine films of rubber in order to measure their physical or mechanical properties, or in the form of profiled elements which can be used directly, after cutting out and/or assembly to the dimensions desired, for example, as semi-finished products for tires, in particular for treads.

The cross-linking was carried out at 150° C. for 40 minutes. It will be noted that all the zinc monoxide (ZnO) is in this case was introduced conventionally during the second stage of thermomechanical working, in order to obtain the cross-linkable compositions F and G. The results obtained are set forth in Table 11 below:

TABLE 11

| COMPOSITION | F<br>E-SBR F | G<br>E-SBR G |
|---|---|---|
| ML(1 + 4) 100° C.$_{rubber}$<br>Properties in the<br>non-vulcanized state | 45 | 49 |
| ML(1 + 4) 100° C.<br>Properties in the<br>vulcanized state | 40 | 47 |
| Shore A | 64.1 | 62.1 |
| ME10 (MPa) | 4.80 | 4.39 |
| ME100 (MPa) | 1.37 | 1.56 |
| ME300 (MPa) | 1.48 | 1.79 |
| ME300/ME100 | 1.08 | 1.15 |
| Scott break index<br>at 20° C. | | |
| BL (MPa) | 21.1 | 20.1 |
| EB (%) | 642 | 569 |
| Losses 60° C. (def. 40%) | 37.6 | 35.4 |
| Dynamic properties as<br>a function of deformation | | |
| ΔG* 23° C. (MPa) | 5.25 | 2.18 |
| Tan(δ)$_{max}$ 23° C. | 0.420 | 0.319 |

As far as the properties in the cross-linked state are concerned, it will be noted, on one hand, that the ratio ME300/ME100 of composition G according to the invention (based on E-SBR G having acrylic acid functions along the chain) is greater than that of composition F (based on non-functional E-SBR F) and, on the other hand, that the hysteresis properties (losses at 60° C. and tan(δ) max at 23° C.) are improved compared with the hysteresis properties of composition F.

It would also appear that this composition G has a Mooney viscosity of mix which is similar to that of composition F, that is to say a processing ability which is close to that of said composition F.

In other words, the elastomer E-SBR G, which comprises acrylic acid functions along the chain, makes it possible to obtain compositions having rubber properties in the cross-linked state which are improved compared with those of the "control" compositions based on a non-functional elastomer prepared in emulsion, and furthermore having a processing ability which is close to that of such "control" compositions.

(G) Seventh Comparative Example

In this example, the properties of three rubber compositions F, G and G' of the "passenger-car"-tread type were compared with each other, the compositions F and G having been defined in the preceding example and the new composition G' also being based on the elastomer E-SBR G having acrylic acid functions along the chain. Composition G' differed from composition G only by the fact that all the ZnO is introduced into the internal mixer during the first stage of thermomechanical working and at a temperature of 120° C. The results obtained are set forth in Table 12 below:

TABLE 12

| COMPOSITION | F<br>E-SBR F | G<br>E-SBR G | G'<br>E-SBR G |
|---|---|---|---|
| ML(1 + 4) 100° C.$_{rubber}$<br>Properties in the<br>non-vulcanized state | 45 | 49 | 49 |
| ML(1 + 4) 100° C.<br>Properties in the<br>vulcanized state | 40 | 47 | 46 |
| Shore A | 64.1 | 62.1 | 62.5 |
| ME10 (MPa) | 4.80 | 4.39 | 4.17 |
| ME100 (MPa) | 1.37 | 1.56 | 1.46 |
| ME300 (MPa) | 1.48 | 1.79 | 1.69 |
| ME300/ME100 | 1.08 | 1.15 | 1.15 |
| Scott break<br>index at 20° C. | | | |
| BL (MPa) | 21.1 | 20.3 | 20.6 |
| EB (%) | 642 | 569 | 585 |
| Losses 60° C. (def. 40%) | 37.6 | 35.4 | 36.2 |
| Dynamic properties as<br>a function of deformation | | | |
| ΔG* 23° C. (MPa) | 5.25 | 2.18 | 1.81 |
| Tan(δ)$_{max}$23 ° C. | 0.420 | 0.319 | 0.301 |

As far as the properties in the cross-linked state are concerned, it will be noted, on one hand, that the ratio ME300/ME100 of composition G', based on E-SBR G and with the addition of ZnO during the first stage of thermomechanical working, is greater than that of the "control" composition F and, on the other hand, that the hysteresis properties (losses at 60° C. and tan(δ) max at 23° C.) are greatly improved compared with the hysteresis properties of said composition F. These results also show that composition G' has hysteresis properties at low deformations which are improved compared with those of composition G.

Furthermore, it would appear that this composition G' according to the invention has a Mooney viscosity of mix which is substantially identical to that of composition F (based on a non-functional elastomer prepared in emulsion). In other words, this composition G' has hysteresis properties at low deformations which are improved compared with those obtained with the compositions F and G, and furthermore a processing ability which is close to that of said "control" composition F.

(H) Eighth Comparative Example

In this example, the properties of two rubber compositions H and I of the "passenger-car"-tread type were compared, composition H being based on the non-functional E-SBR H and extended with the oil described in Example 1(F) above and composition I being based on E-SBR I comprising methacrylic acid functions along the chain (see Example 1(G) above).

The formulation used for each of these compositions H and I was as follows (in phr):

| | |
|---|---|
| Elastomer extended with oil | 127.5 |
| Silica (1) | 80 |
| Aromatic oil "ENERFLEX 65" | 10 |
| Bonding agent (2) | 6.4 |
| ZnO | 2.5 |
| Stearic acid | 1.5 |
| Antioxidant (3) | 1.9 |
| Ozone wax "C32ST" | 1.5 |
| Sulfur | 1.1 |
| Sulfenamide(4) | 2 |
| Diphenylguanidine | 1.5 | wherein:
(1) = The silica ZEOSIL 1165MP (RP);
(2) = The bonding agent Si69 from Dégussa;
(3) = N-(1,3-dimethylbutyl)-N'-phenyl-p-phenylendediamine; and
(4) = N-cyclohexyl-2-benzothiazylsulfenamide.

wherein:
(1)=The silica "Zeosil 1165(RP);
(2)=The bonding agent "Si69Dégussa;
(3)=N-(1,3-dimethylbutyl)-N'-phenyl-p-phenylenediamine; and
(4)=N-cyclohexyl-2-benzothiazylsulfenamide.

Each of these compositions H, I was produced in the manner described in Example 2(F) above (in particular, with conventional introduction of the ZnO during the second stage of thermomechanical working). The results obtained are set forth in Table 13 below:

TABLE 13

| COMPOSITION | H<br>E-SBR H | I<br>E-SBR I |
|---|---|---|
| ML(1 + 4) 100° C. rubber<br>Properties in the<br>non-vulcanized state | 50 | 48 |
| ML(1 + 4) 100° C.<br>Properties in the vulcanized state | 67 | 64 |
| Shore A | 67.2 | 68.7 |
| ME10 (MPa) | 6.44 | 6.76 |
| ME100 (MPa) | 1.72 | 2.09 |
| ME300 (MPa) | 1.95 | 2.37 |
| ME300/ME100 | 1.13 | 1.13 |
| Scott break index<br>at 20° C. | | |
| BL (MPa) | 24.8 | 23.1 |
| EB (%) | 590 | 519 |
| Losses 60° C. (def. 40%) | 34.0 | 33.0 |
| Dynamic properties as<br>a function of deformation | | |
| ΔG* 23° C. (MPa) | 5.64 | 4.04 |
| Tan(δ)$_{max\ at}$ 23° C. | 0.400 | 0.345 |

As far as the properties in the cross-linked state are concerned, it will be noted that the hysteresis properties (losses at 60° C. and tan(δ) max at 23° C.) of composition I according to the invention (based on an elastomer having methacrylic acid functions along the chain) are improved compared with the hysteresis properties of the "control" composition H (based on non-functional elastomer prepared in emulsion).

It would also appear that this composition I according to the invention has a Mooney viscosity of mix which is substantially identical to that of the "control" composition H, that is to say a processing ability which is close to that of said composition H. In other words, the elastomer E-SBR I makes it possible to obtain compositions having rubber properties in the cross-linked state which are improved compared with those of the "control" compositions based on a non-functional elastomer prepared in emulsion, and furthermore having a processing ability which is close to that of such "control" compositions.

(I) Ninth Comparative Example

In this example, the properties of three rubber compositions H, I and I' of the "passenger-car"-tread type were compared with each other, the compositions H and I having been defined above and the new composition I' differing from composition I solely in that all the ZnO was added during the first stage of thermomechanical working. The results obtained are set forth in Table 14 below:

TABLE 14

| COMPOSITION | H<br>E-SBR H | I<br>E-SBR I | I'<br>E-SBR I |
|---|---|---|---|
| ML(1 + 4) 100° C. rubber<br>Properties in the non-vulcanized state | 50 | 48 | 48 |
| ML(1 + 4) 100° C.<br>Properties in the vulcanized state | 67 | 64 | 65 |
| Shore A | 67.2 | 68.7 | 68.5 |
| ME10 (MPa) | 6.44 | 6.76 | 6.49 |
| ME100 (MPa) | 1.72 | 2.09 | 2.02 |
| ME300 (MPa) | 1.95 | 2.37 | 2.29 |
| ME300/ME100 | 1.13 | 1.13 | 1.13 |
| Scott break index at 20° C. | | | |
| BL (MPa) | 24.8 | 23.1 | 23.5 |
| EB (%) | 590 | 519 | 535 |
| Losses 60° C. (def. 40%) | 34.0 | 33.0 | 33.3 |
| Dynamic properties as a<br>function of deformation | | | |
| ΔG* 23° C. (MPa) | 5.64 | 4.04 | 3.53 |
| Tan(δ)$_{max}$ 23° C. | 0.400 | 0.345 | 0.341 |

As far as the properties in the cross-linked state are concerned, it will be noted that the hysteresis properties (losses at 60° C. and tan(δ) max at 23° C.) of composition I' according to the invention are improved compared with the hysteresis properties of composition H. These results also show that this composition I' makes it possible to obtain hysteresis properties at low deformations which are improved compared with those of composition I.

Furthermore, it would appear that composition I' has a Mooney viscosity of mix which is substantially identical to that of said "control" composition H based on a non-functional elastomer prepared in emulsion. In other words, composition I' has hysteresis properties at low deformations which are improved compared with those obtained with the compositions H and I, and it furthermore has a processing ability which is close to that of said "control" composition H.

We claim:

1. A cross-linkable or cross-linked rubber composition usable to constitute a tread for a tire, wherein said composition comprises:
(a) a reinforcing filler comprising a reinforcing inorganic filler, wherein the mass fraction of said reinforcing inorganic filler in said reinforcing filler is greater than 50%;
(b) at least one diene elastomer having a molar ratio of units originating from conjugated dienes which is greater than 30% and comprising carboxylic acid functions along its chain, wherein said diene elastomer comprising carboxylic acid functions along its chain is obtained, in emulsion, by a copolymerization process including adding to an emulsifying solution a co-monomer comprising an unsaturated aliphatic carboxylic acid, such that said at least one diene elastomer comprises unsaturated aliphatic carboxylic acid function along its chain;
  (c) a reinforcing inorganic filler/diene elastomer coupling agent; and
  (d) a sulphur-based cross-linking system.

2. The cross-likable or cross-linked rubber composition according to claim 1, wherein said unsaturated aliphatic carboxylic acid is acrylic acid and wherein said diene elastomer comprises acrylic acid functions along its chain.

3. The cross-linkable or cross-linked rubber composition according to claim 1, wherein said reinforcing inorganic filler comprises a highly dispersible alumina.

4. The cross-linkable or cross-linked rubber composition according to claim 1, wherein said reinforcing inorganic filler comprises silica.

5. The cross-linkable or cross-linked rubber composition according to claim 1, wherein said reinforcing filler is present in said rubber composition in an amount of equal to or greater than 40 parts by weight per hundred parts of diene elastomer.

6. The cross-linkable or cross-linked rubber composition according to claim 1, wherein said reinforcing inorganic filler/diene elastomer coupling agent comprises a polysulfide alkoxysilane.

7. The cross-likable or cross-linked rubber composition according to claim 6, wherein said polysulfide alkoxysilane is bis(3-triethoxysilylpropyl)tetrasulfide.

8. The cross-likable or cross-linked rubber composition according to claim 1, wherein said at least one diene elastomer is selected from the group consisting of a homopolymer obtained by polymerization of a conjugated diene monomer having from 4 to 12 carbon atoms and a copolymer obtained by copolymerization of one or more dienes conjugated together or with one or more vinyl aromatic compounds having from 8 to 20 carbon atoms.

9. The cross-linkable or cross-linked rubber composition according to claim 1, wherein said at least one diene elastomer is selected from the group consisting of polybutadienes, butadiene/styrene copolymers and butadiene/styrene/isoprene copolymers.

10. The cross-linkable or cross-linked rubber composition according to claim 1, wherein said at least one diene elastomer comprising carboxylic acid functions along its chain is a butadiene/styrene copolymer prepared in emulsion.

11. The cross-linkable or cross-linked rubber composition according to claim 10, wherein said at least one diene elastomer comprises an emulsifier in an amount less than 3.5 parts by weight per hundred parts of diene elastomer.

12. The cross-likable or cross-linked rubber composition according to claim 1, wherein said at least one diene elastomer comprising carboxylic acid functions along its chain further comprises an extender oil in an amount that ranges between 0 and 50 parts by weight per hundred parts of diene elastomer, said extender oil being selected from the group consisting of paraffinic oil, aromatic oil, and naphthenic oil.

13. The cross-linkable or cross-linked rubber composition according to claim 1, wherein said at least one diene elastomer comprising carboxylic acid functions along its chain has a number average molecular weight exceeding 100,000 g/mol.

14. The cross-linkable or cross-linked rubber composition according to claim 1, wherein said rubber composition comprises an elastomeric matrix comprising in majority or formed by said at least one diene elastomer comprising carboxylic acid functions along its chain.

15. A tread for a tire comprising the cross-linkable or cross-linked rubber composition according to claim 1.

16. The tread according to claim 15 consisting of the cross-linkable or cross-linked rubber composition according to claim 1.

17. A tire comprising the tread according to claim 15.

18. A tire comprising the tread according to claim 16.

* * * * *